US008380711B2

(12) United States Patent
Datta et al.

(10) Patent No.: US 8,380,711 B2
(45) Date of Patent: Feb. 19, 2013

(54) HIERARCHICAL RANKING OF FACIAL ATTRIBUTES

(75) Inventors: Ankur Datta, White Plains, NY (US); Rogerio S. Feris, White Plains, NY (US); Sharathchandra U. Pankanti, Darien, CT (US); Daniel A. Vaquero, Santa Barbara, CA (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 13/045,092

(22) Filed: Mar. 10, 2011

(65) Prior Publication Data

US 2012/0233159 A1    Sep. 13, 2012

(51) Int. Cl.
G06F 7/00 (2006.01)
G06F 17/30 (2006.01)
(52) U.S. Cl. ......... 707/723; 707/748; 707/798; 707/915
(58) Field of Classification Search .................. 707/723, 707/748, 798, 915
See application file for complete search history.

(56) References Cited

U.S. PATENT DOCUMENTS

| 5,802,361 | A | 9/1998 | Wang et al. |
| 5,841,958 | A * | 11/1998 | Buss et al. ................. 345/440 |
| 7,551,755 | B1 | 6/2009 | Steinberg et al. |
| 7,564,994 | B1 | 7/2009 | Steinberg et al. |
| 7,779,268 | B2 * | 8/2010 | Draper et al. ............... 713/186 |
| 2002/0093591 | A1 * | 7/2002 | Gong et al. ................. 348/515 |
| 2007/0174633 | A1 * | 7/2007 | Draper et al. ............... 713/186 |
| 2007/0183661 | A1 * | 8/2007 | El-Maleh et al. ............ 382/173 |
| 2009/0063455 | A1 * | 3/2009 | Li et al. ........................... 707/5 |
| 2009/0234842 | A1 | 9/2009 | Luo et al. |
| 2010/0074479 | A1 | 3/2010 | Chou et al. |
| 2011/0106656 | A1 * | 5/2011 | Schieffelin .................. 705/26.9 |

OTHER PUBLICATIONS

Bo Tang et al, Hierarchical Architecture for Content-based Retrieval, School of Electronic Science and Engineering, National University of Defense Technology, Changsha, 410073, Hunan Province, China, Journal of National University of Defense Technology, Jun. 2006.
Wei Xiong et al, Combining Multilevel Visual Features for Medical Image Retrieval in ImageCLEFmed 2005, Institute for Infocomm Research, 21 Heng Mui Keng Terrace, Singapore 119613, 2005, 8 pp.

\* cited by examiner

Primary Examiner — Phong Nguyen
(74) Attorney, Agent, or Firm — Patrick J. Daugherty; Driggs, Hogg, Daugherty & Del Zoppo Co., LPA (57) ABSTRACT

In response to a query of discernible facial attributes, the locations of distinct and different facial regions are estimated from face image data, each relevant to different attributes. Different features are extracted from the estimated facial regions from database facial images, which are ranked in base layer rankings by matching feature vectors in a bipartite graph to a base layer ranking sequence as a function of edge weights parameterized by an associated base layer parameter vector. Second-layer rankings define second-layer attribute vectors as bilinear combinations of the base-layer feature vectors and associated base layer parameter vectors for common attributes, which are matched in a bipartite graph to a second-layer ranking sequence as a function of edge weights parameterized by associated second-layer parameter vectors. The images are thus ranked for relevance to the query as a function of fusing the second-layer rankings.

25 Claims, 3 Drawing Sheets

HIERARCHICAL RANKING OF FACIAL ATTRIBUTES

BACKGROUND

The present invention relates to utilizing computer vision applications for the automated searching of human image data for people as a function of visual appearance characteristics.

Video camera feeds and data there from may be searched to find targeted objects or individuals. For example, to search for a person, one may provide description information indicating certain personal facial visual traits to a manager of a video archive (for example, wearing glasses, baseball hat, etc.), wherein the archive may be manually scanned looking for one or more people with similar characteristics. Such a manual search is both time and human resource consuming. Moreover, human visual attention may be ineffective, particularly for large volumes of video data. Due to many factors, illustratively including an infrequency of activities of interest, a fundamental tedium associated with the task and poor reliability in object tracking in environments with visual clutter and other distractions, human analysis of video information may be both expensive and ineffective.

Automated video systems and methods are known wherein computers or other programmable devices directly analyze video data and attempt to recognize objects, people, events or activities of concern through computer vision applications. However, discernment of individual people or objects by prior art automated video surveillance systems and methods systems is often not reliable in a realistic, real-world environments and applications due to a variety of factors, for example, clutter, poor or variable lighting and object resolutions, distracting competing visual information, etc. Analysis of human activity within a video is generally limited to capturing and recognizing a set of certain predominant activities, each of which requires supervised learning and thus lots of labeled data.

BRIEF SUMMARY

In one embodiment of the present invention, a method for ranking images with respect to query attributes comprehends, in response to a query of specified, discernible facial attributes, estimating the locations of distinct and different facial regions from face image data that are each relevant to the different facial attributes. The method further includes extracting different features from the estimated facial regions from database facial images and ranking via a programmable device the facial images in each of a plurality of base layer rankings by matching feature vectors in a bipartite graph to a base layer ranking sequence as a function of edge weights parameterized by an associated base layer parameter vector, the feature vectors each a relevance of the features extracted from one of the images to one of the attributes relevant to one of the estimated regions, and wherein each of the base layer region-feature rankings are for different ones of the extracted features and the attributes. The method further includes ranking the facial images in second-layer rankings by defining multi-dimensional second-layer attribute vectors as bilinear combinations of one of base-layer feature vectors and associated base layer parameter vectors for common attributes, and matching the second-layer attribute vectors in a bipartite graph to a second-layer ranking sequence as a function of edge weights parameterized by an associated second-layer parameter vector. Lastly, the images are ranked for relevance to the query as a function of fusing the second-layer rankings.

In another embodiment, a system has a processing unit, computer readable memory and a computer readable storage medium device with program instructions to, in response to a query of specified, discernible facial attributes, estimate the locations of distinct and different facial regions from face image data that are each relevant to the different facial attributes. The instructions are further to extract different features from the estimated facial regions from database facial images and rank the facial images in each of a plurality of base layer rankings by matching feature vectors in a bipartite graph to a base layer ranking sequence as a function of edge weights parameterized by an associated base layer parameter vector, the feature vectors each a relevance of the features extracted from one of the images to one of the attributes relevant to one of the estimated regions, and wherein each of the base layer region-feature rankings are for different ones of the extracted features and the attributes. The instructions are also to rank the facial images in second-layer rankings by defining multi-dimensional second-layer attribute vectors as bilinear combinations of one of base-layer feature vectors and associated base layer parameter vectors for common attributes, and matching the second-layer attribute vectors in a bipartite graph to a second-layer ranking sequence as a function of edge weights parameterized by an associated second-layer parameter vector. Lastly, the instructions are to rank the images for relevance to the query as a function of fusing the second-layer rankings.

In another embodiment, an article of manufacture has a computer readable storage medium device with computer readable program code embodied therewith, the computer readable program code comprising instructions that, when executed by a computer processor, cause the computer processor to, in response to a query of specified, discernible facial attributes, estimate the locations of distinct and different facial regions from face image data that are each relevant to the different facial attributes. The instructions are further to extract different features from the estimated facial regions from database facial images and rank the facial images in each of a plurality of base layer rankings by matching feature vectors in a bipartite graph to a base layer ranking sequence as a function of edge weights parameterized by an associated base layer parameter vector, the feature vectors each a relevance of the features extracted from one of the images to one of the attributes relevant to one of the estimated regions, and wherein each of the base layer region-feature rankings are for different ones of the extracted features and the attributes. The instruction are also to rank the facial images in second-layer rankings by defining multi-dimensional second-layer attribute vectors as bilinear combinations of one of base-layer feature vectors and associated base layer parameter vectors for common attributes, and matching the second-layer attribute vectors in a bipartite graph to a second-layer ranking sequence as a function of edge weights parameterized by an associated second-layer parameter vector. Lastly, the instructions are to rank the images for relevance to the query as a function of fusing the second-layer rankings.

In another embodiment, a method for providing a service for ranking images with respect to query attributes includes providing a computer infrastructure that, in response to a query of specified, discernible facial attributes, estimates the locations of distinct and different facial regions from face image data that are each relevant to the different facial attributes. The computer infrastructure further extracts different features from the estimated facial regions from database facial images and ranks the facial images in each of a plurality of base layer rankings by matching feature vectors in a bipartite graph to a base layer ranking sequence as a function of edge weights parameterized by an associated base layer parameter vector, the feature vectors each a relevance of the features extracted from one of the images to one of the attributes relevant to one of the estimated regions, and wherein each of the base layer region-feature rankings are for different ones of the extracted features and the attributes. The computer infrastructure also ranks the facial images in second-layer rankings by defining multi-dimensional second-layer attribute vectors as bilinear combinations of one of base-layer feature vectors and associated base layer parameter vectors for common attributes, and matching the second-layer attribute vectors in a bipartite graph to a second-layer ranking sequence as a function of edge weights parameterized by an associated second-layer parameter vector. Lastly, the computer infrastructure ranks the images for relevance to the query as a function of fusing the second-layer rankings.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
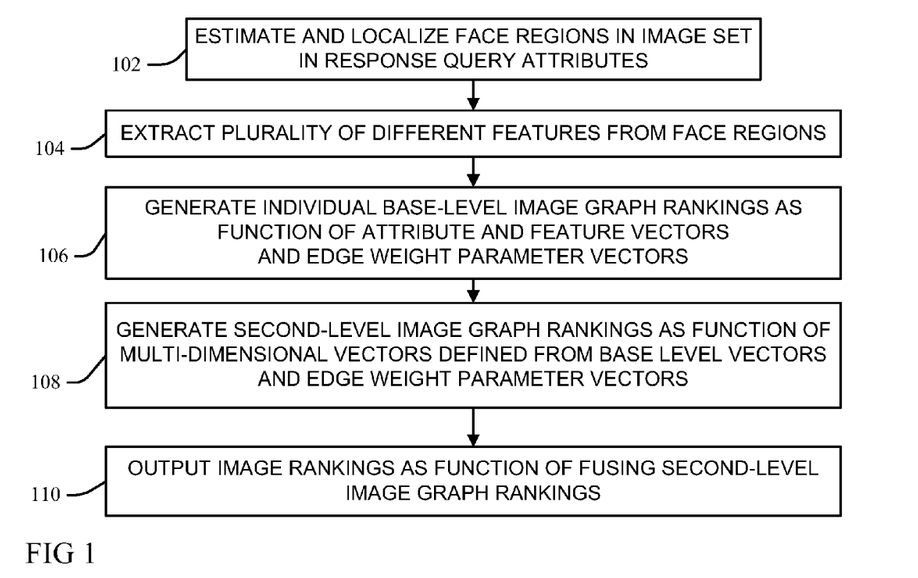
FIG. 1 is a flow chart illustration of an embodiment of a method or system for hierarchical ranking of images with respect to query attributes according to the present invention.

Referring now to FIG. 1, an embodiment of a method, process or system for attribute-based searching of people from image data according to the present invention is illustrated. Given a query containing a set of facial attributes of a person and an input database of face images, the process or systems retrieves and ranks the images of people in the database that satisfy the query. More particularly, at 102, in response to a query for a person (or persons) comprising a plurality of specified visual facial attributes (for example, bald, sunglasses, bearded, etc.) that may be discernible from a visual face image data from the database (for example, real-time or archived video streams or discrete still image pictures captured from cameras, scanners, etc.), a programmable device according to the present invention classifies facial regions relevant to each of the specified query facial attributes by estimating and localizing the location(s) of the facial regions that are each relevant to different ones of the specified facial attributes, and wherein the plurality of facial regions are distinct and different from each other. For example, upper face region locations are estimated for "bald" or "not bald" query attributes, middle face regions for "glasses" or "no-glasses," and lower face regions for "beard" or "no beard", etc.

At 104, a plurality of different features are extracted from the database images from each of the regions estimated at 102, generally through one extractor for each feature, though in some embodiments one extractor may be used to extract multiple features. Exemplary features include shape, texture, and color, though other features may be extracted.

The archived images are ranked as a function of the extracted features in a multi-layer (or level) process, wherein each layer learns rankings from the previous layer. Thus, in one embodiment at 106 in a base, first layer or level the images are ranked with respect to each attribute in a plurality of independent, individual hierarchical attribute rankings. Each of the hierarchical attribute rankings are determined through a bipartite graph matching, matching base-layer feature vectors for the respective extracted feature for each of the images in one partition to a ranking (for example, non-increasing) sequence forming the other partition as a function of edge weights parameterized by a parameter vector in base-layer rankings, wherein the feature vectors are each a relevance of the features extracted from each image from one of the regions estimated as relevant to one of the attributes. Each of the respective base-layer parameter vectors are solved so that sorted relevance scores of the respective feature vectors match labeled rank-positions according to a base-layer training data set (for example, a matching matrix), and wherein each of the plurality of base layer region-feature rankings are for different ones of the plurality extracted features and the plurality of attributes.

At 108, the individual base-layer feature-attribute rankings are combined or fused into a second, higher layer/level ranking of the images through defining multi-dimensional higher-level attribute vectors for each of the images. More particularly, each dimension is defined as a bilinear combination of a feature vector and its associated base layer parameter vector, the dimensions in each of the vectors coming from the base-layer rankings for a common attribute. The higher, second-level ranking is another bipartite graph matching of the multi-dimensional second-level feature vectors for each of the images in one partition to a second-layer ranking sequence in the other partition as a function of edge weights parameterized by an associated second-layer parameter vector. Each associated second-layer parameter vector is solved so that sorted relevance scores of the multi-dimensional second-layer attribute vectors match labeled rank-positions according to a second-layer training data set (for example, a matching matrix).

Thus, the second level ranking at 108 of the hierarchy (as well as optionally any subsequent higher-level ranking, including a final ranking of the images) therefore learns its ranking function on top of the scores obtained by its immediate lower level in the hierarchy, to create new relevance vectors (and thereby rankings) for each image with respect to relevance to the query (or attribute portion thereof) at each level, and which in turn may be processed by any subsequent layer into a final fused ranking. In the present example, a final ranking of the images for relevance to the query ranking is thus generated by fusing the plurality of multi-dimensional second-layer attribute rankings generated at the second level at 108 to output a final image ranking at 110 of a hierarchy of the images with respect to satisfying the original query input at 102.

Thus, determining the final ranking by fusing the second-layer attribute rankings at 110 may be a simple combination of the individual hierarchical attribute feature vectors (concatenation, summing individual scores or vector values, etc). Alternatively, in some embodiments, fusing at 110 comprises defining each dimension of each of a plurality of multi-dimensional third-layer image vectors as bilinear combinations of each of the second-layer attribute vectors and associated second-layer parameter vectors, and matching the multi-dimensional multi-dimension third-layer image vectors in a bipartite graph to a third-layer ranking sequence as a function of edge weights parameterized by an associated third-layer parameter vector, wherein each associated third-layer parameter vector is solved so that sorted relevance scores of the multi-dimension third-layer image vectors match labeled rank-positions according to a third-layer training data set (for example, a matching matrix).

Utilizing the ranking processes formulated as graph matching problems as from previous layers or levels as described above leverages structured prediction techniques for learning. Incorporation of such hierarchies not only enables rank learning for lower level extracted features but learns to rank fusions of the lower level vectors across the features, at each subsequent, higher level. In one aspect, the present invention provides improved ranking accuracy relative to non-hierarchical baseline approaches.

Ranking according to embodiments of the present invention may comprise finding an appropriate permutation $\{\pi \in \Pi\}$ of a collection of documents given a particular query $\{q\}$ and a collection of documents $\{d_i \in D\}$, along with a relevance for each document $\{d_i\}$. (It will be noted that the "documents" and "images" may be used interchangeably in the present discussion.) The objective of said embodiments is to find an optimal permutation $\{\pi^*\}$ that sorts the documents in decreasing order, i.e., the most relevant documents are at the top. For example, let us denote by $\{g(d_i, q)\}$ the relevance score of a document $\{d_i \in D\}$ given the query $\{q\}$. An optimal permutation $\{\pi^*\}$ maximizes an inner product $\{<g(D, q); c(\pi)>\}$, where $c(\pi)$ denotes the permutation of a non-increasing sequence $\{c \in R^m\}$ and $\{m\}$ is the number of documents. In other words, the optimal permutation $\{\pi^*\}$ sorts the relevance scores $\{g(d_i, q)\}$ in the same non-increasing order as the non-increasing sequence $\{c\}$, as represented by formulation [1]:

$$\pi^* = \arg\max \Pi\Sigma_{i=1}^m g(d_i, q) c(\pi)_i \qquad [1].$$

The relevance scores of each document-query pair $\{g(d_i, q)\}$ may be parameterized as a bilinear combination $\{g(d_i, q) = <\phi_i, \theta>\}$, where $\{\phi_i\}$ is the feature vector for the document $\{d_i\}$ and $\{\theta\}$ is a parameter vector, which when combined with formulation [1] give us formulation [2]:

$$\pi^* = \arg\max \Pi\Sigma_{i=1}^m <\phi_i, \theta> c(\pi)_i \qquad [2].$$

Formulation [2] may be considered a bipartite graph matching problem, where the features $\{\phi_i\}$ of the documents form one partition, the non-increasing sequence $\{c\}$ forms the other partition, and the edge weights are parameterized by the parameter vector $\{\theta\}$.

In one embodiment, graph matching considers a weighted bipartite graph $\{G=(V, E, w)\}$, where $\{V\}$ is the set of $\{2m\}$ vertices, $\{E\}$ is the $\{"m*m"\}$ set of edges and $\{w: E \rightarrow R\}$ is an $\{m*m\}$ set of real-valued weights. Graph matching comprises determining a bijection $\{\pi:\{1, 2, \ldots, m) \rightarrow (1, 2, \ldots, m)\}\}$ to maximize the following criterion as formulated by formulation [3]:

$$\pi^* = \arg\max \Pi\Sigma_{i=1}^m w_{i,y(i)} \qquad [3],$$

where $\{w_{i,y(i)}\}$ is the weight between image vertex $\{i\}$ and the relevancy vertex $\{y(i)\}$ respectively for a particular bijection $\{y\}$. Using the substitution $\{w_{i,y(i)} = <\phi_i, \theta> c_{yi}\}$, it is apparent that formulations [2] and [3] above are two forms of the same problem. It is noted that in this case the solution of the graph matching problem may be obtained by sorting the documents according to $\{<\phi_i, \theta>\}$, rather than using algorithms, for example, a Hungarian algorithm which has cubic time asymptotic complexity.

Figure 2A:
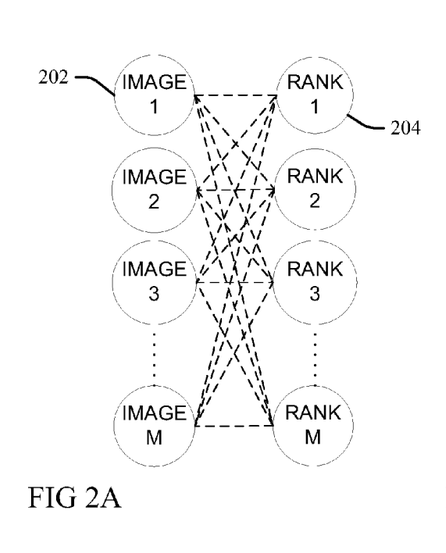
FIGS. 2A and 2B are diagrammatical illustrations of a bipartite graph for ranking according to embodiments of the present invention.
Figure 2B:
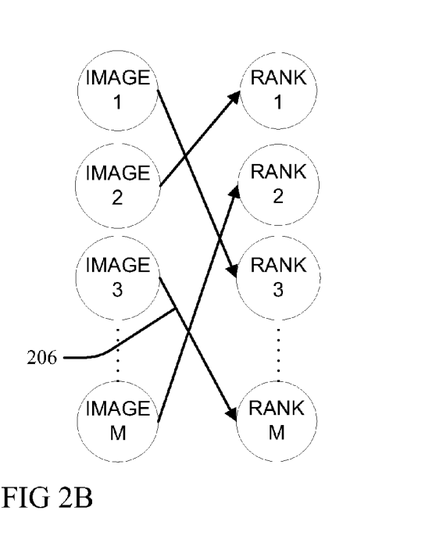

FIGS. 2A and 2B show a bipartite graph where each edge is associated with a real-valued weight $\{w_{ij}\}$ that measures the compatibility between a lower-level vector $\{\phi_i\}$ 202 of each image $\{i\}$ and a rank position $\{j\}$ 204 of that level. The weight $\{w_{ij}\}$ may be parameterized not only by the image features and rank position but also by a parameter vector $\{\theta\}$ according to $\{w_q = <\phi_c, \theta> c_j\}$, wherein each edge in the graph measures the compatibility between layer vector $\{\phi_i\}$ 202 of the image $\{i\}$ (in the present example, a feature vector) and the rank position $\{j\}$) 204. The goal of embodiments of the present invention is to learn the parameter vector $\{\theta\}$ that best matches the sorted weighted scores according to the supplied training data set of (image, rank position) pairs 206 as shown in FIG. 2(B).

For example, consider a labeled data set with $\{N\}$ graph matching exemplars (i.e., bipartite graphs with the corresponding manually labeled matches) according to formulation [4] below:

$$D = \{(x^n, y^n)\}_{n=1}^N \in (X,Y)^N \qquad [4],$$

wherein $\{x\}$ is a document and $\{y\}$ is the relevance of the document to the query; $\{x^n = \{x^n_{11}, \ldots, x^n_{m*m}\}$; each node $\{(p,q)\}$ in a graph $\{x^n\}$ is represented as $\{x^n_{pq} = <\phi_p, \theta> c_q\}$, where $\{\phi_p\}$ is the input feature vector for a node $\{p\}$; $\{c_q\}$ is the $q^{th}$ rank position where $\{1 \leq q \leq m\}$; $\{y^n\}$ is a $\{m*m\}$ binary matching matrix; and $\{y^n_{pq} = 1\}$ if node $\{p\}$ maps to node $\{q\}$, and equals zero otherwise.

Some embodiments of the present invention solve for the parameter vector $\{\theta\}$ so that sorted relevance scores $\{<\phi_p, \theta>\}$ match the labeled rank-positions $\{c_q\}$ according to the binary matching matrix $\{y^n\}$, which is a structured prediction problem. Though a max-margin approach may be used to solve for the parameter vector $\{\theta\}$, such an approach is generally not statistically consistent, and accordingly embodiments of the present invention instead generally take a "maximum a posteriori" (MAP) approach. More particularly, under the assumption of an exponential family model, the conditional posterior probability of the labeled matches given the observed data can be expressed as formulation [5]:

$$p(y|x;\theta) = \exp(\psi(x,y) - f(x;\theta)), \qquad [5]$$

where $\{f(x; \theta)\}$ is a log-partition function, a convex and differentiable function of the parameter vector $\{\theta\}$, and the function $\{\psi(x,y)\}$ is defined supra. The prediction under an exponential model is defined as formulation [6]:

$$y^* = \arg\max_Y p(y \mid x; \theta) = \arg\max_Y \langle\psi(x, y), \theta\rangle. \qquad [6]$$

Solving the graph matching problem under an exponential family model, the solution of the matching problem in formulation [3] is equated to the prediction of the exponential family model in formulation [6]. The function $\{\psi(x,y)\}$ scores the bipartite graph $\{x\}$ according to the matching binary matrix $\{y\}$, and may be parameterized in terms of weights for individual pairs of nodes as formulation [7]:

$$\psi(x, y) = \sum_{i=1}^m \phi_i c_{y(i)}. \qquad [7]$$

The log-partition function $\{f(x; \theta)\}$ of formulation [5] may be defined as formulation [8]:

$$f(x; \theta) = \log\sum_Y \exp(\langle\psi(x, y), \theta\rangle), \qquad [8]$$

which is a convex and differentiable function of the parameter vector $\{\theta\}$. Assuming independent and identically distributed (i.i.d.) sampling, we define formulation [9]:

$$P(y|x;\theta) = \Pi_{n=1}^N p(y^n|x^n;\theta). \qquad [9]$$

The parameter vector $\{\theta\}$ may thus be obtained under a MAP estimation according to formulation [10]:

$$p(\theta \mid y, x) \propto \exp\left(\log p(\theta) + \sum_{n=1}^N (\psi(x^n, y^n) - f(x^n; \theta))\right), \qquad [10]$$

where $\{p(\theta)\}$ is a Gaussian prior on the parameter vector $\{\theta\}$. A loss function, which is the negative log-posterior of formulation [10], may be written as formulation [11]:

$$l(y \mid \theta, x) = \frac{\lambda}{2}\|\theta\|^2 + \frac{1}{N}\sum_{n=1}^N (f(x^n; \theta) - \psi(x^n, y^n)), \qquad [11]$$

where $\{\psi\}$ is a regularization constant.

In one aspect, according to a bilinear weight definition $\{w_{i,y(i)} = <\phi_i, c_{y(i)}, \theta>\}$ the loss function (formulation [11]) is a convex and differentiable function of the parameter vector $\{\theta\}$, wherein standard gradient-descent may be used to compute the minimum of said formulation [11].

A visual facial attribute may be represented by multiple feature descriptors. For example, an attribute such as "bald" may be represented by its color, shape and texture features, though other features may be practiced. Prior art learning-to-rank approaches for such multi-feature representations may concatenate all feature descriptors into a single high-dimensional feature vector, which is then used for learning. However, such approaches pose severe risks of overfitting. Alternate prior art approaches may use dimensionality reduction, such as Principal Component Analysis (PCA), to project a high-dimensional concatenated feature vector onto a lower-dimensional feature space. While the use of dimensionality reduction reduces the risk of overfitting, it fails to utilize the interactions that exist between the different features.

In contrast, embodiments of the present invention generally provide a hierarchical learning-to-rank process or system that provides a principled formulation for combining different feature descriptors into a single, multi-level hierarchical model for fused ranking score, and which reduce the risk of over fitting associated with using the concatenated feature vector. The embodiments learn a ranking function hierarchically, where each level of the hierarchy learns to rank the scores obtained by its immediate lower level layer, for example by using the formulations described above. At the lowest layer, independent rankers for each feature descriptor (e.g., color, shape, texture) are learned. The scores obtained from each individual ranker are then combined to create a new feature vector which is used to learn a ranking function for the subsequent higher level of the hierarchy. This process continues until the root node is reached, which then learns a ranking function for its immediate lower level of the hierarchy to generate the final ranking result.

Figure 3:
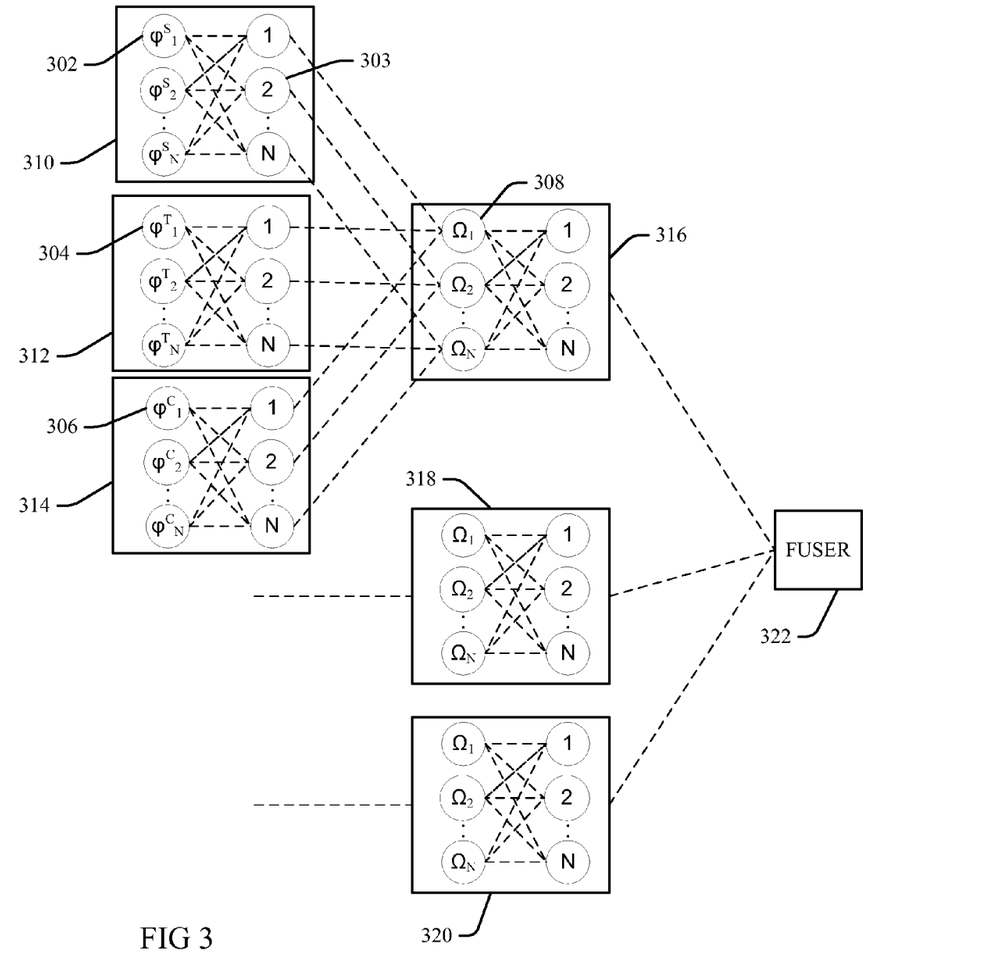
FIG. 3 is a diagrammatical illustration of an exemplary hierarchical ranking model according to embodiments of the present invention.

FIG. 3 illustrates an exemplary hierarchical ranking model according to embodiments of the present invention. At the base level of the hierarchy (from left to right), three types of features that each describe an attribute for an $\{i^{th}\}$ image (a shape descriptor $\{\phi^{Si}\}$ 302, texture descriptor $\{\phi^{Ti}\}$ 304, and color descriptor $\{\phi^{Ci}\}$ 306) are each ranked with respect to rank positions 303 through the bipartite graph matching processes and systems described above. Thus, ranking functions are first learned independently for each of the three feature descriptor vectors 302, 304, and 306, resulting in the individual attribute hierarchy rankings 310, 312 and 314, respectively, as a function of the parameter vectors $\{\theta\}$ for each of the three feature descriptors: $\{\theta^S\}$, $\{\theta^T\}$ and $\{\theta^C\}$ for the shape 302, texture 304, and color descriptors 306, respectively, as discussed above.

In the next, second-level layer, a higher-level feature descriptor $\{\Omega_i\}$ 308 is computed from the base-layer feature vectors 302, 304, and 306 and their respective parameter vectors $\{\theta^S\}$, $\{\theta^T\}$ and $\{\theta^C\}$ according to formulation [12]:

$$\Omega_i = \{\langle \phi_i^S, \theta^S \rangle, \langle \phi_i^T, \theta^T \rangle, \langle \phi_i^C, \theta^C \rangle\},\quad [12]$$

wherein $\{\Omega_i\}$ 308 is a three-dimensional feature vector for the $\{i^{th}\}$ image at the highest level of the hierarchy for one of the attributes, and $\{\langle \phi,\theta \rangle\}$ denotes a bilinear combination, and which may be used to compute the parameter vector as described above. In the present example, a higher, second-level fused attribute ranking 316 for one of three attributes (bald or not bald, glasses or no glasses, and beard or no beard) is thereby determined, which learns a ranking function on top of the scores obtained by its immediate lower levels 310, 312 and 314 for each of the three feature vectors. This process is repeated for the three extracted feature vectors for each of the other two attributes, resulting in additional second-level attribute rankings 318 and 320, the second-level attribute rankings each thereby learning a ranking function on top of the individual features scores obtained by its immediate lower level in the hierarchy. The second-level attribute rankings 316, 318 and 320 are then combined into the third-level final ranking by Fuser 322 that combines the individual attribute rankings into a composite ranking response to the query itself, through a simple combination (concatenation, summing individual scores or vector values, etc.) or through another bipartite graph matching process as described above. Incorporation of hierarchy thus not only enables rank learning for any lower level features, but may also learn to rank the fusion across the features at one or more subsequent levels.

Figure 4:
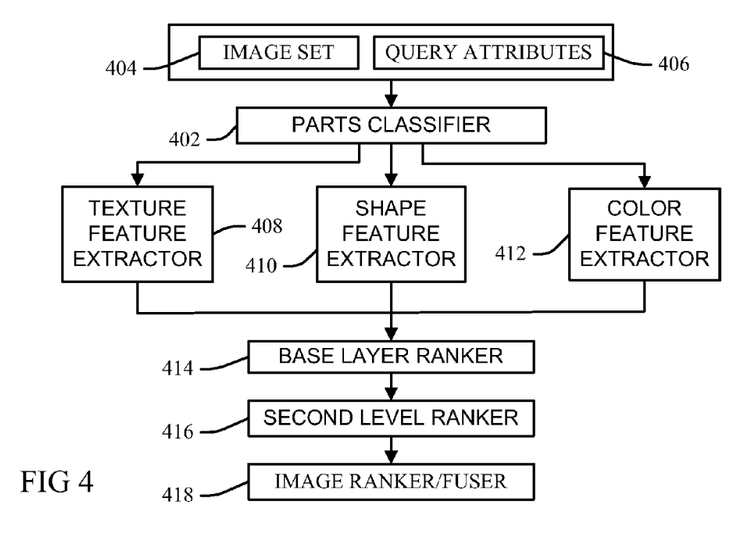
FIG. 4 is a block diagram illustration of an apparatus or device embodiment of the present invention.

FIG. 4 illustrates an apparatus or device that ranks through the bipartite graph matching process illustrated in FIGS. 1 through 3 and described above, with more particularly with respect to the shape descriptor $\{\phi^{Si}\}$ 302, texture descriptor $\{\phi^{Ti}\}$ 304, and color descriptor $\{\phi^{Ci}\}$ 306 illustrated by FIG. 3. Thus, in response to a query 406 containing a the set of three attributes (bald or not bald, glasses or no glasses, and beard or no beard) that may be discernible from a visual face image data from an image database 404, a Parts Classifier device 402 classifies facial regions relevant to each of the specified query facial attributes by estimating and localizing faces in the image data into different and distinct regions for feature extraction as a function of the respective attributes: upper face extraction regions for queries by the "bald or not bald" hair type attribute; middle face extraction regions for the "glasses or no glasses" eyewear type attributes; and lower face extraction regions for the "beard or no beard" facial hair type attribute. In one embodiment, the respective upper part, middle part, and lower part face sub-regions are localized by applying a cascade of Adaptive Boosting (Adaboost) classifiers trained to detect faces and then split the detected face regions into three parts, though other embodiments of the present invention may practice other techniques, as will be appreciated by one skilled in the art. Localization mistakes made by the Parts Classifier device 402 may be manually corrected, in order to decouple the evaluation of the hierarchical ranking model from errors in the localization of facial regions, though automated processes may be used in some embodiments. It will also be appreciated that the invention is not limited to the illustrative, but not exhaustive embodiments described, and that more or less or different attributes, face regions and feature may be practiced in other embodiments of the present invention.

In the present example, three feature descriptor extractor devices are provided, one for each of three different categories: a Texture Feature Extractor device 408, a Shape Feature Extractor device 410, and a Color Feature Extractor device 412. However, these are illustrative but not exhaustive examples, and it will be appreciated that more or less extractor devices may be practiced in other embodiments of the present invention, and that some alternative feature extractor devices may extract more than one feature (for example, texture and shape, or all features, etc.).

In one example, the Texture Feature Extractor device 408 utilizes histograms of Local Binary Patterns (LBP) to represent the texture information, wherein a descriptor computes an integer in [0, 255] for every pixel in a face region, and a histogram of these values is generated, leading to a 256-dimensional feature vector.

In one embodiment, the Shape Feature Extractor device 410 uses a Shape Binary Patterns (SBP) descriptor to capture shape information, similar to LBP but considering shape contours as input. Thus, given a grayscale image of a face region, its contours are computed by applying a Canny edge detector, a multi-stage algorithm that detects a wide range of edges in images. Then, for every pixel in a contour, context is analyzed by counting how many other contour pixels are inside each of eight neighboring regions, the counts thresholded to generate an eight-bit vector. Similarly to LBP, the eight-bit vector is arranged in counterclockwise order starting from a reference point, is encoded as an integer in the interval [0, 255], and a histogram of the integers for the face region being considered is created, resulting in a 256-dimensional feature vector.

In one example, the Color Feature Extractor device 412 uses color histograms in multiple color spaces to represent color information. A given red-green-blue (RGB) image of a face region is converted into the following color spaces: HSV (Hue, Saturation, Value; also sometimes known as "HSB" for "Hue, Saturation, Brightness"); YCbCr (where Y is luminance and Cb and Cr are blue-difference and red-difference chroma components); and YIQ (where Y represents luma information, the achromatic image without any color, and I and Q represent "In-phase" and "Quadrature" chrominance information, respectively, in quadrature amplitude modulation). Each channel is quantized from each color space into 32 bins of equal size and a normalized histogram computed, resulting in a 96-dimensional feature descriptor for each color space.

The present embodiment provides two layers of rankers: a first, Base-Layer Ranker 414 that generates individual, separate ranking of the images as a function of the different extracted features and attributes. In the present example, in response to the three different features (texture, shape, color) and the three different attributes (bald or not bald, glasses or no glasses, and beard or no beard) the Base-Layer Ranker 414 generates nine individual, separate sets of feature vectors and base-level rankings through the bipartite graph matching processes and systems described above. Then, an upper Second Level Ranker 416 learns a set of second-level rankings from the base-level rankings. In the present example, the images in the image database 404 are thus ranked in three different second-level rankings for each of the three different attributes, with individual, separate sets of attribute vectors learned from the base-level rankings feature vectors through the bipartite graph matching processes and systems described above. Lastly, the three second-layer attribute rankings are combined by a third-level Image Ranker or Fuser 418 that generates a final, single ranking hierarchy of the images with respect to satisfying the original query of 406. As discussed above, the Image Ranker/Fuser 418 may simply combine the second-level hierarchical vectors, or it may also use the bipartite graph matching processes and systems described above. It will also be appreciated that any of the Rankers 414-416-418 may perform one or more, or all, of the base, second and third level rankings.

In some embodiments of the Rankers 414-416-418, during training for the bipartite graph matching processes and systems described above, a given attribute (for example, "bald" or "bearded") is represented using multiple queries, each query corresponding to a set of images associated to relevance ratings in {0, 1}, thereby encoding opposite concepts, such as "bald" and "not bald." In this fashion, a different hierarchical model may be trained for each of the feature-attribute combinations (here, nine). However, as will be appreciated by one skilled in the art, more or less relevance ratings may be considered and utilized.

In one implementation of the embodiment of FIG. 4 described above, a database of frontal face images with slight pose variations was created, wherein the respective upper part, middle part and lower part face regions were cropped and rescaled to thirty-by-twenty (30×20) pixels before feature extraction by the Extractors 408-410-412. For each image, a 256-dimensional LBP vector, a 256-dimensional SBP vector, and four 96-dimensional color histogram vectors (one for each color space, with 32 bins per color channel) were then extracted, wherein the concatenated feature vector of all these features is 896-dimensional.

A query-document training data was generated for each facial attribute, wherein given a query that describes an attribute (such as "bald" or "beard", etc.) relevant and non-relevant images as described by their feature vectors were sampled randomly from the dataset 404. The dataset 404 was labeled such that non-relevant and relevant images are given scores of zero (0) and one (1), respectively, for each of the nine facial region/attribute combinations. In one test, the number of relevant images that were chosen for a given query varied from one image to 15 images and the number of non-relevant images ranged from eight images to 120 images.

For each of the nine feature/attribute combinations, the hierarchical model was trained with two layers, wherein the second layer Fuser 418 fuses six structured prediction scores obtained from the Rankers 414-416-418 through each of the LBP, SBP, HSV, RGB, YCbCr, and YIQ models as input. Different ranking models were also trained in order to compare their performance to the embodiment of FIG. 4; six non-hierarchical LBP, SBP, HSV, RGB, YCbCr, and YIQ models using exponential family graph matching and ranking techniques, each using a single feature type as input depending on the input feature type; and a seventh concatenated (concat) model, which is also non-hierarchical but uses the 896-dimensional concatenated vector of LBP, SBP and the four color features as input.

A test set for each particular query/attribute was generated randomly from the labeled dataset; the number of test images for a query ranged from 9 images to 135 images. The number of relevant images relative to a query in the test set was fixed to ⅓ times the number of test images. Given the test set, the images were scored and sorted using the eight different ranking models. A Normalized Discount Cumulative Gain (NDCG) score was used to assess the accuracy of the obtained rankings over the test dataset, the NDCG score is defined by formulation [13]:

$$NDCG@k = \frac{1}{Z}\sum_{j=1}^{k} \frac{2^{r(j)}-1}{\log(1+j)}, \quad [13]$$

where {k} is the position that we are looking at in the ranking, $\{1 \leq k \leq 10\}$, {r(j)} is the relevance of the $\{j^{th}\}$ document in the ranked list, and {Z} is a normalization constant to ensure that perfect ranking yields an NDCG score of (1.0). In other words, the higher the NDCG score, the better is the accuracy of the ranking.

When each of the ranking experiments for the nine feature/attributes according to the eight ranking models were repeated one, five, ten and 15 times with random test data sets and the results averaged, NDCG scores for different attributes and models illustrate that: (i) hierarchical structured prediction output by the Fuser 418 does better than non-hierarchical prediction using the concatenated feature vector for eight out of the nine feature/attribute rankings; and (ii) also outperforms every other model in six of the nine, while staying competitive for the remaining three. The results can be justified by observing that the high dimensionality of the concatenated feature vector may cause over fitting and worse generalization. On the other hand, the hierarchical approach of FIG. 4 splits the high-dimensional optimization problem into a few smaller optimization problems, which reduces the risk of overfitting; at the same time, the upper layer Fuser 418 is able to better capture the correlations that may exist between different feature types. For sunglasses, the only attribute for which the hierarchical approach of FIG. 4 scored lower, the training images have lower intra-class variability in terms of color/texture/shape, and therefore overfitting issues for the high-dimensional "concat" vector are minimized. When mean NDCG scores are compared, as the number of training examples is varied from 9 to 135 images, the hierarchical model of FIG. 4 outperforms most of the non-hierarchical models for most of the attributes, and on average the NDCG@10 score of the hierarchical approach according to FIG. 4 across all the attributes is 0.22, a 16% improvement over the score of the prior art concat feature approach of 0.19, and the present embodiment is also 31% better than the single best feature that can be employed out of the color, shape and texture features under the prior art.

Figure 5:
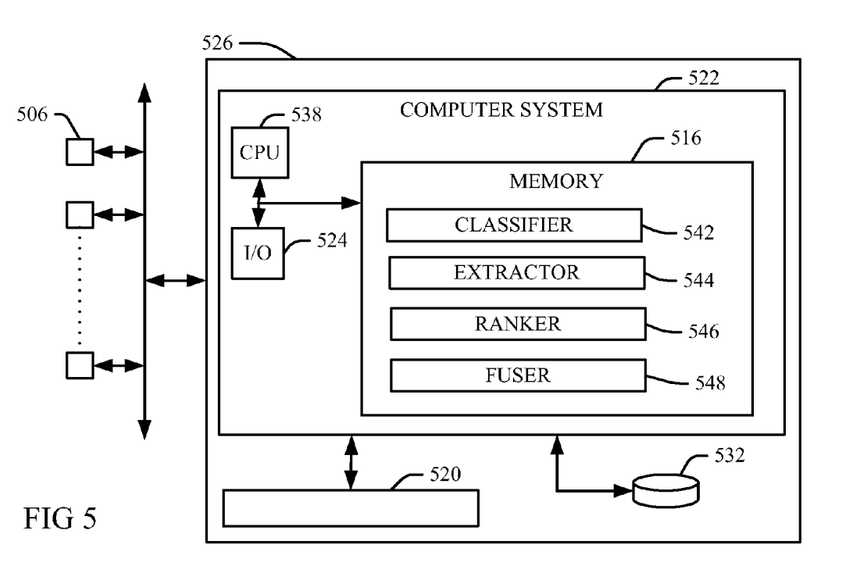
FIG. 5 is a block diagram illustration of a computerized implementation of an embodiment of the present invention.

Referring now to FIG. 5, an exemplary computerized implementation of an embodiment of the present invention includes computer or other programmable device 522 in communication with other devices 506 (for example, a video camera or video server, or a memory device comprising a database of images, etc.) that searches images and ranks the searched images with respect to query attributes as described above with respect to FIGS. 1 through 4, for example, in response to computer readable code in a file residing in a computer memory 516 or a storage system 532 or in another device 506 accessed through a computer network infrastructure 526. Thus, the code when implemented from the memory 516 by the processing unit 538 may provide a facial region Classifier 542, a feature Extractor 544, a hierarchical bipartite graph matching Ranker 546 and a final ranking Fuser 548 that combines a second-last level of a plurality of different rankings of the images into a final, single ranking with respect to query attributes as described above with respect to FIGS. 1-4.

The computer 522 comprises various components, some of which are illustrated within the computer 522. More particularly, as shown, the computer 522 includes a processing unit (CPU) 538 in communication with one or more external I/O devices/resources 524, storage systems 532 or other devices 520. In general, the processing unit 538 may execute computer program code, such as the code to implement one or more of the process steps illustrated in FIG. 1, which is stored in the memory 516 and/or the storage system 532.

Moreover, the processing unit (CPU) 538 may comprise a single processing unit, or be distributed across one or more processing units in one or more locations, e.g., on a client and server. Similarly, the memory 516 and/or the storage system 532 can comprise any combination of various types of data storage and/or transmission media that reside at one or more physical locations. Further, I/O interfaces 524 can comprise any system for exchanging information with one or more of an external server and/or client (not shown). Still further, it is understood that one or more additional components (e.g., system software, math co-processing unit, etc.), not shown, can be included in the computer 522.

One embodiment performs process steps of the invention on a subscription, advertising, and/or fee basis. That is, a service provider could offer to provide automated searches of images and rankings with respect to query attributes as described above with respect to FIGS. 1-4. Thus, the service provider can create, maintain, and support, etc., a computer infrastructure, such as the network computer system 522 and/or network environment 526 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for providing automated searches of images and rankings with respect to query attributes as described above with respect to FIGS. 1-4. In this case, a computer infrastructure, such as the computer 522 or network infrastructure 526, can be provided and one or more systems for performing the process steps of the invention can be obtained (e.g., created, purchased, used, modified, etc.) and deployed to the computer 522 infrastructure. To this extent, the deployment of a system can comprise one or more of: (1) installing program code on a computing device, such as the computers/devices 522, from a computer-readable medium device 516, 520 or 506; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for ranking images with respect to query attributes, the method comprising:
   in response to a query comprising a plurality of specified facial attributes that are each discernible from face image data, estimating the locations of a plurality of facial regions that are each relevant to different ones of the specified facial attributes, and wherein the plurality of facial regions are distinct and different from each other;

extracting a plurality of different features from the estimated facial regions of each of a plurality of database facial images;

ranking via a programmable device the database facial images in each of a plurality of base layer rankings by matching feature vectors in a bipartite graph to a base layer ranking sequence as a function of edge weights parameterized by an associated base layer parameter vector, wherein the feature vectors are each a relevance of the features extracted from one of the images to one of the attributes relevant to one of the estimated regions, wherein each of the plurality of base layer region-feature rankings are for different ones of the plurality extracted features and the plurality of attributes;

ranking the database facial images in each of a plurality of second-layer rankings by:
  defining each of a plurality of multi-dimensional second-layer attribute vectors as bilinear combinations of one of the feature vectors and its associated base layer parameter vector from each of the base-layer rankings for a common one of the attributes; and
  matching the multi-dimensional second-layer attribute vectors in a bipartite graph to a second-layer ranking sequence as a function of edge weights parameterized by an associated second-layer parameter vector; and
ranking the images for relevance to the query as a function of fusing the second-layer rankings.

2. The method of claim 1, wherein the base-layer and the second-layer parameterized edge weights each measure a compatibility between an associated vector of an associated image and a rank position of the associated image.

3. The method of claim 2, further comprising solving for at least one of the base-layer parameter vector and the second-layer parameter vector through a maximum a posteriori approach.

4. The method of claim 2, wherein each associated base layer parameter vector in the plurality of base layer rankings is solved so that sorted relevance scores of the base layer feature vectors match labeled rank-positions according to a base-layer training data set; and
  wherein each of the associated second-layer parameter vectors in the plurality of second-layer rankings is solved so that sorted relevance scores of the multi-dimensional second-layer attribute vectors match labeled rank-positions according to a second-layer training data set.

5. The method of claim 4, wherein the ranking the images for relevance to the query as the function of fusing the second-layer rankings comprises:
  defining each of a plurality of multi-dimensional third-layer image vectors as bilinear combinations of each of the second-layer attribute vectors and its associated second-layer parameter vector; and
  matching the multi-dimensional multi-dimension third-layer image vectors in a bipartite graph to a third-layer ranking sequence as a function of edge weights parameterized by an associated third-layer parameter vector.

6. The method of claim 5, wherein each of the associated third-layer parameter vectors in the third-layer ranking sequences is solved so that sorted relevance scores of the multi-dimension third-layer image vectors match labeled rank-positions according to a third-layer training data set.

7. The method of claim 4, wherein the ranking the images for relevance to the query as the function of fusing the second-layer rankings comprises determining a final ranking as a function of a combination of the multi-dimensional multi-dimension third-layer image vectors.

8. The method of claim 4, wherein the plurality of extracted features comprise shape features, texture features, and color features, and wherein the estimated facial regions comprise a lower face region, a middle face region and an upper face region.

9. The method of claim 8, wherein at least one of the base-layer training data set and the second-layer training data set is a binary matching matrix.

10. A system, comprising:
  a processing unit, computer readable memory and a computer readable storage medium device;
  first program instructions to, in response to a query comprising a plurality of specified facial attributes that are each discernible from face image data, estimate the locations of a plurality of facial regions that are each relevant to different ones of the specified facial attributes, and wherein the plurality of facial regions are distinct and different from each other;
  second program instructions to extract a plurality of different features from the estimated facial regions of each of a plurality of database facial images;
  third program instructions to:
    rank the database facial images in each of a plurality of base layer rankings by matching feature vectors in a bipartite graph to a base layer ranking sequence as a function of edge weights parameterized by an associated base layer parameter vector, wherein the feature vectors are each a relevance of the features extracted from one of the images to one of the attributes relevant to one of the estimated regions, wherein each of the plurality of base layer region-feature rankings are for different ones of the plurality of extracted features and the plurality of attributes; and
    rank the database facial images in each of a plurality of second-layer rankings by defining each of a plurality of multi-dimensional second-layer attribute vectors as bilinear combinations of one of the feature vectors and its associated base layer parameter vector from each of the base-layer rankings for a common one of the attributes, and matching the multi-dimensional second-layer attribute vectors in a bipartite graph to a second-layer ranking sequence as a function of edge weights parameterized by an associated second-layer parameter vector; and
  fourth program instructions to rank the images for relevance to the query as a function of fusing the second-layer rankings; and
  wherein the first, second, third and fourth program instructions are stored on the computer readable storage medium device for execution by the processing unit via the computer readable memory.

11. The system of claim 10, wherein the base-layer and the second-layer parameterized edge weights each measure a compatibility between an associated vector of an associated image and a rank position of the associated image; and
  wherein the third program instructions are to:
    solve each of the base layer parameter vectors in the plurality of base layer rankings so that sorted relevance scores of the base layer feature vectors match labeled rank-positions according to a base-layer training data set; and solve each of the second-layer parameter vectors in the plurality of second-layer rankings so that sorted relevance scores of the multi-dimensional second-layer attribute vectors match labeled rank-positions according to a second-layer training data set.

12. The system of claim 11, wherein the fourth program instructions are to rank the images for relevance to the query as the function of fusing the second-layer rankings by:
defining each of a plurality of multi-dimensional third-layer image vectors as bilinear combinations of each of the second-layer attribute vectors and its associated second-layer parameter vector; and
matching the multi-dimensional multi-dimension third-layer image vectors in a bipartite graph to a third-layer ranking sequence as a function of edge weights parameterized by an associated third-layer parameter vector.

13. The system of claim 12, wherein the fourth program instructions are further to solve each of the associated third-layer parameter vectors in the third-layer ranking sequences so that sorted relevance scores of the multi-dimension third-layer image vectors match labeled rank-positions according to a third-layer training data set.

14. The system of claim 11, wherein the fourth program instructions are to rank the images for relevance to the query as the function of fusing the second-layer rankings by determining a final ranking as a function of a combination of the multi-dimensional multi-dimension third-layer image vectors.

15. The system of claim 11, wherein the plurality of extracted features comprise shape features, texture features, and color features;
wherein the estimated facial regions comprise a lower face region, a middle face region and an upper face region; and
wherein at least one of the base-layer training data set and the second-layer training data set is a binary matching matrix.

16. An article of manufacture, comprising:
a computer readable storage medium device having computer readable program code embodied therewith, the computer readable program code comprising instructions that, when executed by a computer processor, cause the computer processor to:
in response to a query comprising a plurality of specified facial attributes that are each discernible from face image data, estimate the locations of a plurality of facial regions that are each relevant to different ones of the specified facial attributes, and wherein the plurality of facial regions are distinct and different from each other;
extract a plurality of different features from the estimated facial regions of each of a plurality of database facial images;
rank the database facial images in each of a plurality of base layer rankings by matching feature vectors in a bipartite graph to a base layer ranking sequence as a function of edge weights parameterized by an associated base layer parameter vector, wherein the feature vectors are each a relevance of the features extracted from one of the images to one of the attributes relevant to one of the estimated regions, wherein each of the plurality of base layer region-feature rankings are for different ones of the plurality extracted features and the plurality of attributes;
rank the database facial images in each of a plurality of second-layer rankings by defining each of a plurality of multi-dimensional second-layer attribute vectors as bilinear combinations of one of the feature vectors and its associated base layer parameter vector from each of the base-layer rankings for a common one of the attributes, and matching the multi-dimensional second-layer attribute vectors in a bipartite graph to a second-layer ranking sequence as a function of edge weights parameterized by an associated second-layer parameter vector; and
rank the images for relevance to the query as a function of fusing the second-layer rankings.

17. The article of manufacture of claim 16, wherein the base-layer and the second-layer parameterized edge weights each measure a compatibility between an associated vector of an associated image and a rank position of the associated image; and
wherein the computer readable program code instructions, when executed by the computer processor, further cause the computer processor to:
solve each of the base layer parameter vectors in the plurality of base layer rankings so that sorted relevance scores of the base layer feature vectors match labeled rank-positions according to a base-layer training data set; and
solve each of the second-layer parameter vectors in the plurality of second-layer rankings so that sorted relevance scores of the multi-dimensional second-layer attribute vectors match labeled rank-positions according to a second-layer training data set.

18. The article of manufacture of claim 17, wherein the computer readable program code instructions, when executed by the computer processor, further cause the computer processor to rank the images for relevance to the query as the function of fusing the second-layer rankings by:
defining each of a plurality of multi-dimensional third-layer image vectors as bilinear combinations of each of the second-layer attribute vectors and its associated second-layer parameter vector; and
matching the multi-dimensional multi-dimension third-layer image vectors in a bipartite graph to a third-layer ranking sequence as a function of edge weights parameterized by an associated third-layer parameter vector.

19. The article of manufacture of claim 18, wherein the computer readable program code instructions, when executed by the computer processor, further cause the computer processor to solve each of the associated third-layer parameter vectors in the third-layer ranking sequences so that sorted relevance scores of the multi-dimension third-layer image vectors match labeled rank-positions according to a third-layer training data set.

20. The article of manufacture of claim 17, wherein the plurality of extracted features comprise shape features, texture features, and color features;
wherein the estimated facial regions comprise a lower face region, a middle face region and an upper face region; and
wherein at least one of the base-layer training data set and the second-layer training data set is a binary matching matrix.

21. A method for providing a service for ranking images with respect to query attributes, the method comprising:
providing a computer infrastructure that:
in response to a query comprising a plurality of specified facial attributes that are each discernible from face image data, estimates the locations of a plurality of facial regions that are each relevant to different ones of the specified facial attributes, and wherein the plurality of facial regions are distinct and different from each other;

extracts a plurality of different features from the estimated facial regions of each of a plurality of database facial images;

ranks the database facial images in each of a plurality of base layer rankings by matching feature vectors in a bipartite graph to a base layer ranking sequence as a function of edge weights parameterized by an associated base layer parameter vector, wherein the feature vectors are each a relevance of the features extracted from one of the images to one of the attributes relevant to one of the estimated regions, wherein each of the plurality of base layer region-feature rankings are for different ones of the plurality extracted features and the plurality of attributes;

ranks the database facial images in each of a plurality of second-layer rankings by defining each of a plurality of multi-dimensional second-layer attribute vectors as bilinear combinations of one of the feature vectors and its associated base layer parameter vector from each of the base-layer rankings for a common one of the attributes, and matching the multi-dimensional second-layer attribute vectors in a bipartite graph to a second-layer ranking sequence as a function of edge weights parameterized by an associated second-layer parameter vector; and ranks the images for relevance to the query as a function of fusing the second-layer rankings.

22. The method of claim 21, wherein the base-layer and the second-layer parameterized edge weights each measure a compatibility between an associated vector of an associated image and a rank position of the associated image; and
wherein the computer infrastructure further:
solves each of the base layer parameter vectors in the plurality of base layer rankings so that sorted relevance scores of the base layer feature vectors match labeled rank-positions according to a base-layer training data set; and
solves each of the second-layer parameter vectors in the plurality of second-layer rankings so that sorted relevance scores of the multi-dimensional second-layer attribute vectors match labeled rank-positions according to a second-layer training data set.

23. The method of claim 22, wherein the computer infrastructure ranks the images for relevance to the query as the function of fusing the second-layer rankings by:
defining each of a plurality of multi-dimensional third-layer image vectors as bilinear combinations of each of the second-layer attribute vectors and its associated second-layer parameter vector; and
matching the multi-dimensional multi-dimension third-layer image vectors in a bipartite graph to a third-layer ranking sequence as a function of edge weights parameterized by an associated third-layer parameter vector.

24. The method of claim 23, wherein the computer infrastructure solves each of the associated third-layer parameter vectors in the third-layer ranking sequences so that sorted relevance scores of the multi-dimension third-layer image vectors match labeled rank-positions according to a third-layer training data set.

25. The method of claim 22, wherein the plurality of extracted features comprise shape features, texture features, and color features;
wherein the estimated facial regions comprise a lower face region, a middle face region and an upper face region; and
wherein at least one of the base-layer training data set and the second-layer training data set is a binary matching matrix.

* * * * *